Aug. 28, 1956

B. A. SOKOLOFF 2,761,092

INDUCTIVE CHARGES FEEDING CIRCUIT

Filed Feb. 20, 1951

INVENTOR
Boris A. Sokoloff
By Ralph B. Stewart
Attorney 2,761,092

INDUCTIVE CHARGES FEEDING CIRCUIT

Boris Alexandre Sokoloff, Paris, France, assignor to Societe d'Electronique et d'Automatisme, Paris, France, a corporation of France Application February 20, 1951, Serial No. 211,945

Claims priority, application France February 27, 1950

3 Claims. (Cl. 317—123)

Figure 1:
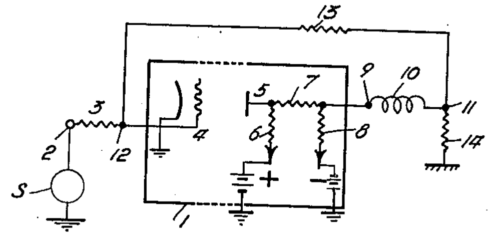

The present invention relates to improvements in the feeding circuits of inductive elements for their current control and, more particularly, though not limitatively, for their D. C. current control; said improvements are substantially concerned with obtaining a very high current response fidelity of said circuits when a voltage is applied upon their input, and, accordingly, enabling a direct embodiment of any current control arrangement with great accuracy and, moreover, establishing said circuits in such a manner that they may feed inductive elements of comparatively small impedances by means of high impedance feeding circuits and, lastly, obtaining these same advantages as well for comparatively rapid variations of the current flowing through said elements as for very slow variations of said current and of any desirable discontinuity.

Accordingly, the invention is mostly advantageous in all cases where such inductive elements constitute the windings of meters of the electro-mechanical type (such as crossed coil instruments, quotient-meters, galvanometers, electrometers and the like) or of the electronic type (such as cathodic ray oscilloscopes and oscillographs).

Said improvements are essentially characterized in that the inductive element is connected in series to ground with a resistor at an output point of an amplifier maintained fixed at a zero D. C. potential in absence of an input signal, the connection point between the inductive element and the grounded resistor being taken as the connection point of a back-coupling connection or channel, re-injecting onto the amplifier input a voltage determined by the potential value which is established at this connecting point during any application of an input signal, and said improvements are further characterized, by the fact that, on the one hand, the amplifier input circuit is supplied through a comparatively high input impedance and that, on the other hand, the impedance of the back-coupling connection such as above defined is of a value comparable to that of the said input impedance; lastly, said improvements are also characterized by the provision, in said back-coupling connection, of a low impedance shunt which is inserted into the circuit only between input signal applications.

Such circuits may, of course, be variously arranged in order to realize any desired control method between the input voltage and the current which flows through the inductive element and, accordingly, the voltage re-injected in the input; considering, by way of example, only the best known applications, said back-coupling connection may comprise a mere resistor in which case the feeding circuit operates as high fidelity voltage-current repeater or, again, a capacitor, in which case, the feeding circuit operates to deliver a current proportional to the integral of the input voltage. Also, the ratio of the input impedance and re-injection values may be varied in order to modify the response ratio of the amplitudes of current and voltage, the gain of the amplifier being predetermined elsewhere. But, in any case, these circuits provide, in practice, a great accuracy of the inductive element control, around 1/1000 and more, without requiring any stabilization of the amplifier power supplies, thus with an amplification, stability and economy which are particularly appreciable in relation to the circuits established for the same purposes in the prior art.

Constitution, operation and application possibilities of the feeding circuits for inductive elements in accordance with the invention will be disclosed more fully in the following description of the accompanying figures which diagrammatically show, by way of illustration:

Figs. 1 and *1a* two arrangements for carrying out the invention for realizing a voltage-current repeater.

Figure 2:
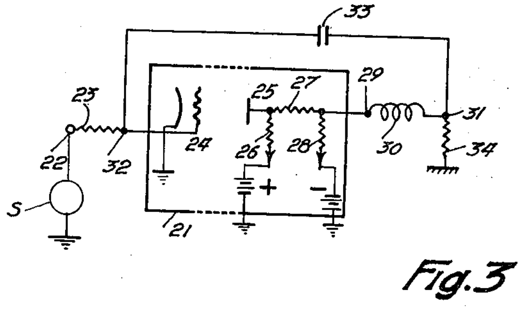

Figs. 2 and *2a* two arrangements for carrying out the invention in realizing a voltage integrator.

Figure 3:
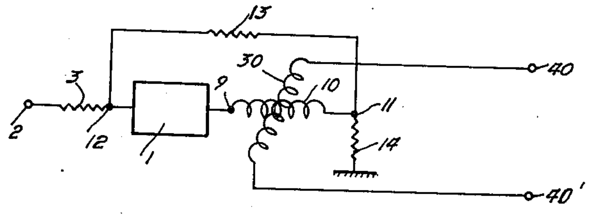
Figure 4:
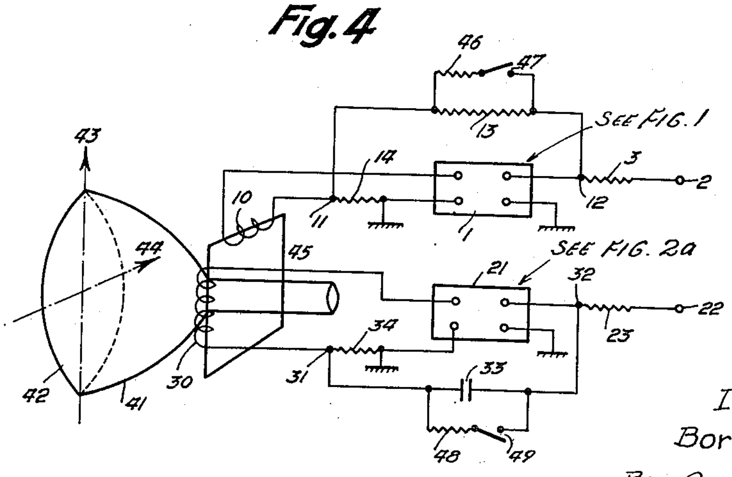

Fig. 3 shows an arrangement for carrying out the invention in a crossed-coil meter, and Fig. 4 another arrangement for carrying out the invention in an oscilloscopic meter with a cathodic ray tube.

With reference to Figure 1 the circuit incorporates an amplifier 1, the input stage or stages of which is or are of any well known usual arrangement, the first stage being controlled through the grid 4 from the control signals source S connected to input terminal 2 and preferably through a high impedance 3 inserted between terminal 2 and the grid 4. Indicated at 5 is the output plate of the last amplifier stage and this plate is supplied with high voltage through the medium of resistor 6; however, said resistor 6 is part of a bridge comprising, furthermore, series resistor 7 and resistor 8 which is connected to the high negative voltage. The positive and negative voltage supply sources are both grounded at one of their extremities, and the values of the resistances 6, 7 and 8 are so chosen that the direct-current potential of the output point 9 of the said bridge or potential divider, and of amplifier 1 is always maintained at a D. C. voltage which is zero in absence of an input signal and will remain such if the signal is A. C. From this point 9 the inductive element indicated in the form of winding 10 is connected to the ungrounded end of a loading resistor 14 having its other end connected to the ground. From point 11 between inductive element 9 and resistor 14 the voltage developed at this point when a signal is applied at 2 is brought back through resistor 13 to point 12 at the input of amplifier 1; the values of resistors 3 and 13 are chosen of the same amplitude order; preferably, also, the gain of the amplifier is chosen rather high, for example of the order of 100 for every stage.

The ratio of the direct and re-injected voltages at 12 depends, of course, upon the gain of the amplifier, but also upon the ratio between the values of resistors 3 and 13 and it remains equal to the amplification if this latter is near unity; on the other hand, resistor 14 is chosen with a comparatively high value compared with the resistive component of the inductance 10. The sensitiveness of the control circuit is determined, therefore, by both coefficients: the value of resistor 14 with respect to the resistive component of the inductive element, and the ratio of the values of resistors 3 and 13. By way of indication it may be stated that the magnitude orders of these resistors must be chosen taking into consideration the desired frequency band, said band always starting, however, from the zero frequency if the amplifier passes D. C.; as an example, in order to reach a frequency value nearing one kilocycle per second, the values of resistors 3 and 13 may be chosen near one megohm and the value of resistor 14 near one thousand ohms; in order to reach the 10 kc./s. these values will be reduced by a ratio of about 10 and so on.

Preferably, furthermore, the amplifier arrangement will be operated with the cathodes grounded in order not to reduce the gain of the valves and, therefore, to provide a maximum safety margin against the fluctuations which do not interfere since the inductive element is connected between two points of D. C. potentials, well determined in the absence of a signal, provided that said fluctuations do not cause the valves of the amplifier to deviate from their linear characteristics.

Figure 1A:
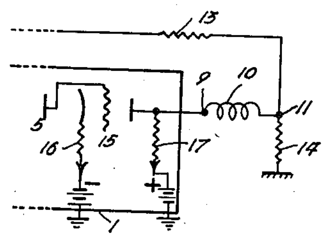

In a modification shown in Figure 1*a*, plate 5 of the last amplifier stage according to Figure 1 is connected to point 9 of inductive coil 10 through a separate output stage, the control grid 15 of which is energized by the output of plate 5 and cathode and plate of which are respectively connected through resistors 16 and 17 to the positive and negative high voltages supply, as shown. The remainder of the circuit remains unchanged; as regards the invention this arrangement is strictly the same as that of Figure 1.

Figure 2A:
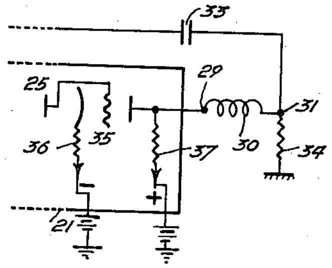

The modification of such high fidelity repeater-amplifiers in order to obtain operation as integrators is performed, of course, through substituting a capacitor 33, Figures 2 and 2*a*, for resistor 13 of the re-injection circuit, Figures 1 and 1*a*. The so obtained integrators effect the passage through inductive element 30 of a current the variation of which will faithfully follow the integral, mathematically speaking, of the input voltage variation; in such a way, the application of a D. C. voltage will effect the passage through inductive coil 30 of a current increasing linearly until saturation of the amplifier and then remaining at this saturation value; if said applied voltage appears in the form of a voltage step the same will be true in the time of application of this step and a reverse variation of the voltage at 22 will then produce a symmetrical decrease of this current, or again, a short-circuit of capacitor 33 will cause the return to zero, in a very short time, of the value established for the current. Such a circuit, therefore, can be used to establish any time base, even a very slow one, for the sweeping of crossed coils of a cathodic ray oscilloscope.

In Figures 2 and 2*a* the reference numerals correspond to the reference numerals of Figures 1 and 1*a* increased by twenty.

Considering Figure 3, direct control of a crossed coil meter 10—30 through at least one control circuit repeater of voltage to current, such as that of Figure 1 (or 1*a*), and applying a fixed reference voltage at terminals 40 and 40' of winding 30, if the pair of windings 10—30 controls the deviation of a pointer or of a luminous ray, a high degree of accuracy is thus obtained in the measurements; this application is of a quite particular interest if the value of the applied voltage to be measured is supplied by a high impedance circuit because the input of amplifier 1 being preferably provided with a high value of resistor 3, winding 10 may be and will be in practice, as usual, of low impedance without any inconvenience. On the other hand, the size of resistors 3 and 13 may be selected so that a voltage of a high value to be measured, even a D. C. voltage, may be applied at 2; for example, an electrometer may thus be constructed using only a single valve amplifier 1 of a gain near 100, a resistor 3 of around 100 megohms or more and a resistor 13 of around one megohm (voltage ratio from 1 to 100, if desired, by arranging said resistors or at least one of them in the form of stud contact piece potentiometers) in order to measure D. C. voltages up to 10,000 volts and more.

Of course, any kind of galvanometer may be chosen as the meter in such an arrangement one of its coils being constituted by winding 10.

Of course, also, terminals 40 and 40' may be those of another inductive coil feeding circuit in accordance with the present invention. In such cases an application of a quite particular interest seems to be that which consists in effecting, for the purposes of oscillography, the control of two deflection windings of a cathodic ray tube, one through a repeater circuit and the other through an integrator circuit, this latter supplying the sweeping time base and the other signal to be displayed. Such an arrangement is shown diagrammatically in Figure 4.

In this figure, 41 designates a cathodic ray tube on the screen 42 of which is to be displayed as visual indications, control signals applied at 2 to effect vertical deflection of the cathode ray along direction 43, for example, and distributed in the period of time along the horizontal direction 44. Both windings 10 and 30 are then established orthogonally on a common magnetic deflection circuit 45 and each of said windings is controlled by a feeding circuit in accordance with the invention, of the above mentioned types. Thus, the control circuit of winding 10 is established according to one of the diagrams of Figures 1 and 1*a* while the control circuit of winding 30 is made according to one of the diagrams of Figures 2 and 2*a*. It is quite obvious that, accordingly, the time base of the horizontal sweep may be regulated at any desired duration by changing capacitor 33 so that the luminous spot on screen 42 will, in the absence of a signal on terminal 2 and in the presence of a D. C. voltage of constant magnitude at 22, move along a straight line with a constant speed the magnitude of which is determined by the mere amplitude of said D. C. voltage; the alternating application of reverse polarity voltages will cause this spot to move back and forth along line 44 (not necessarily at the same speed, however, if the value of capacitor 33 is modified and, more particularly, for a quick return, through closing contact 49 of a low resistance shunt 48 on said capacitor). However, this return will only occur when the polarity of the voltage changes or upon the actual short-circuit of the capacitor.

This shunt, moreover, if actuated prior to any control signal makes it possible to accurately define the starting point of the spot from zero, bringing back to zero the voltage at the terminals of winding 30. It is to be noted that the same is true in this latter respect as regards the application through closing contact 47 of the low resistance shunt 46 across resistor 13 of the other feeding circuit, for winding 10, provided for application of vertical deflection signals of the spot.

It is quite obvious, furthemore, that the recurrent successive application of voltage step impulses at 22 will generate a graduated progression of the spot on screen 42. It is also quite obvious that if the same sinusoidal voltage is applied at 22, on the one hand, and at 2, on the other hand, with the same values of resistors 3, 23 and 13 the spot will move along a circle on screen 42 at any desired low sweeping speed.

What I claim is:

1. In combination, an amplifier having input and output stages, each formed by electron tubes having anode, cathode and grid elements, the said output stage having a direct-current output terminal; a source of positive polarizing voltage grounded at its negative extremity; a source of negative polarizing voltage grounded at its positive extremity; a first resistor connecting the anode of the said output stage to said positive voltage source; a second resistor connecting said anode to said direct-current output terminal; and a third resistor connecting said output terminal to said negative voltage source; the said resistors being adapted to form a voltage-balancing direct-current bridge; an input terminal; an input impedance connecting said input terminal to the grid of said input stage; a load inductance coil having one of its extremities connected to said output terminals; a resistor connecting the other extremity of said coil to ground; and a feed-back connection extending from the said other extremity of said coil and connected directly to the grid of said input stage, the resistors constituting the said bridge and the voltage sources having such values that the said output terminal is maintained substantially at zero direct-current potential in the absence of a signal on the input terminal of said amplifier.

2. An amplifier as claimed in claim 1, in which the said feed-back connection includes a resistor connecting the said other extremity of said load inductance coil to the grid of the said input stage.

3. An amplifier as claimed in claim 1, in which the said feed-back connection includes a condenser connecting the said other extremity of said load inductance coil to the grid of the said input stage.

References Cited in the file of this patent

UNITED STATES PATENTS

| | | |
|---|---|---|
| 2,093,177 | Vance | Sept. 14, 1937 |
| 2,121,359 | Luck et al. | June 21, 1938 |
| 2,137,262 | Bowman-Manifold | Nov. 22, 1938 |
| 2,230,819 | White | Feb. 4, 1941 |
| 2,251,851 | Moore | Aug. 5, 1941 |
| 2,280,990 | White | Apr. 28, 1942 |
| 2,300,133 | Nyquist | Oct. 27, 1942 |
| 2,373,748 | Eaton | Apr. 17, 1945 |
| 2,444,338 | Dimond | June 29, 1948 |
| 2,554,925 | Schlesinger | May 29, 1951 |
| 2,582,603 | Phelan | Jan. 15, 1952 |
| 2,603,750 | Newman | July 15, 1952 |